(12) United States Patent
Reinhoudt et al.

(10) Patent No.: US 9,540,260 B2
(45) Date of Patent: Jan. 10, 2017

(54) APPARATUS FOR REMOVAL OF IONS, AND A METHOD FOR REMOVAL OF IONS

(75) Inventors: Hank Robert Reinhoudt, Delft (NL); Albert Van Der Wal, Oegstgeest (NL); Piotr Edward Dlugolecki, Gdansk (PL)

(73) Assignee: VOLTEA B.V., Sassenheim (NL)

( * ) Notice: Subject to any disclaimer, the term of this patent is extended or adjusted under 35 U.S.C. 154(b) by 700 days.

(21) Appl. No.: 13/698,263

(22) PCT Filed: May 17, 2011

(86) PCT No.: PCT/EP2011/058001
§ 371 (c)(1),
(2), (4) Date: Dec. 7, 2012

(87) PCT Pub. No.: WO2011/144636
PCT Pub. Date: Nov. 24, 2011

(65) Prior Publication Data
US 2013/0075260 A1    Mar. 28, 2013

(30) Foreign Application Priority Data

May 17, 2010   (EP) .................................... 10163021

(51) Int. Cl.
*C02F 1/469*       (2006.01)

(52) U.S. Cl.
CPC .... *C02F 1/4691* (2013.01); *C02F 2201/46115* (2013.01); *C02F 2303/16* (2013.01); *Y10T 29/49117* (2015.01)

(58) Field of Classification Search
CPC .................... C02F 1/469–1/4698; C02F 1/00; C02F 2201/46115; B01D 15/00; B01J 47/08; G01N 30/50; G01N 30/96; G01N 30/6069; G01N 2030/0035
See application file for complete search history.

(56) References Cited

U.S. PATENT DOCUMENTS

| 3,607,735 A | 9/1971 | Hover et al. |
| 4,872,959 A | 10/1989 | Herbst |

(Continued)

FOREIGN PATENT DOCUMENTS

| EP | 2 143 480 | 1/2010 |
| FR | 2 663 862 | 1/1992 |

(Continued)

OTHER PUBLICATIONS

Final Office Action issued for U.S. Appl. No. 13/698,265, dated Jul. 17, 2014.

(Continued)

*Primary Examiner* — Gurpreet Kaur
(74) *Attorney, Agent, or Firm* — Pillsbury Winthrop Shaw Pittman LLP

(57) ABSTRACT

An apparatus and a method to remove ions from water. The apparatus has a housing, an inlet to let water into the housing, an outlet to let water out of the housing, a first and second electrode connected to a power supply configured to create an electrical potential difference between the first and the second electrodes, and a spacer between the first and second electrodes to allow water to flow in between the first and second electrodes. The apparatus includes a velocity adjuster constructed and arranged to adjust a flow velocity of a first portion of the water flowing between the first and second electrodes with respect to a second portion of the water flowing between the first and second electrodes.

23 Claims, 10 Drawing Sheets

(56) References Cited

U.S. PATENT DOCUMENTS

| | | |
|---|---|---|
| 5,503,809 A | 4/1996 | Coate |
| 5,736,023 A | 4/1998 | Gallagher |
| 5,779,891 A * | 7/1998 | Andelman ................. 210/198.2 |
| 8,968,544 B2 | 3/2015 | Van Limpt et al. |
| 2002/0113006 A1* | 8/2002 | Sale et al. ..................... 210/490 |
| 2003/0079992 A1 | 5/2003 | Wilkins |
| 2008/0185294 A1 | 8/2008 | Cai |
| 2008/0283391 A1* | 11/2008 | Ogawa et al. ................. 204/242 |
| 2009/0090627 A1 | 4/2009 | Andelman |
| 2009/0218227 A1 | 9/2009 | Noh |
| 2012/0125776 A1 | 5/2012 | Van Der Wal |
| 2012/0217170 A1 | 8/2012 | Van Der Wal |
| 2013/0062208 A1 | 3/2013 | Reinhoudt |
| 2013/0092542 A1 | 4/2013 | Van Limpt |
| 2013/0098766 A1 | 4/2013 | Van Der Wal |
| 2014/0034501 A1 | 2/2014 | Van Der Wal |

FOREIGN PATENT DOCUMENTS

| | | |
|---|---|---|
| GB | 652 442 | 4/1951 |
| JP | 11-514289 | 12/1999 |
| JP | 2002-313680 | 10/2002 |
| JP | 2004-290919 | 10/2004 |
| WO | WO 2005/009596 | 2/2005 |
| WO | WO 2008/094367 A1 | 8/2008 |
| WO | WO 2011/138663 | 11/2011 |
| WO | WO 2011/144635 | 11/2011 |
| WO | WO 2011/144638 | 11/2011 |

OTHER PUBLICATIONS

Non-Final Office Action as issued for U.S. Appl. No. 13/698,265, dated Dec. 5, 2013.
Final Office Action as issued in U.S. Appl. No. 13/698,265, dated Apr. 10, 2015.
Notice of Reasons for Rejection as issued in Japanese Patent Application No. JP 2013-510605, dated Mar. 3, 2015.
Office Action issued in U.S. Appl. No. 13/698,265, dated Nov. 13, 2014.
Search Report as issued for European Patent Application No. 10163021, dated Sep. 28, 2010.
Search Report, including the Search Opinion, as issued for International Application No. PCT/EP2011/058000, dated Jul. 6, 2011.
Search Report, including the Search Opinion, as issued for International Application No. PCT/EP2011/058001, dated Jul 8, 2011.
Search Report, including the Search Opinion, as issued for International Application No. PCT/EP2011/058003, dated Jul. 6, 2011.

* cited by examiner

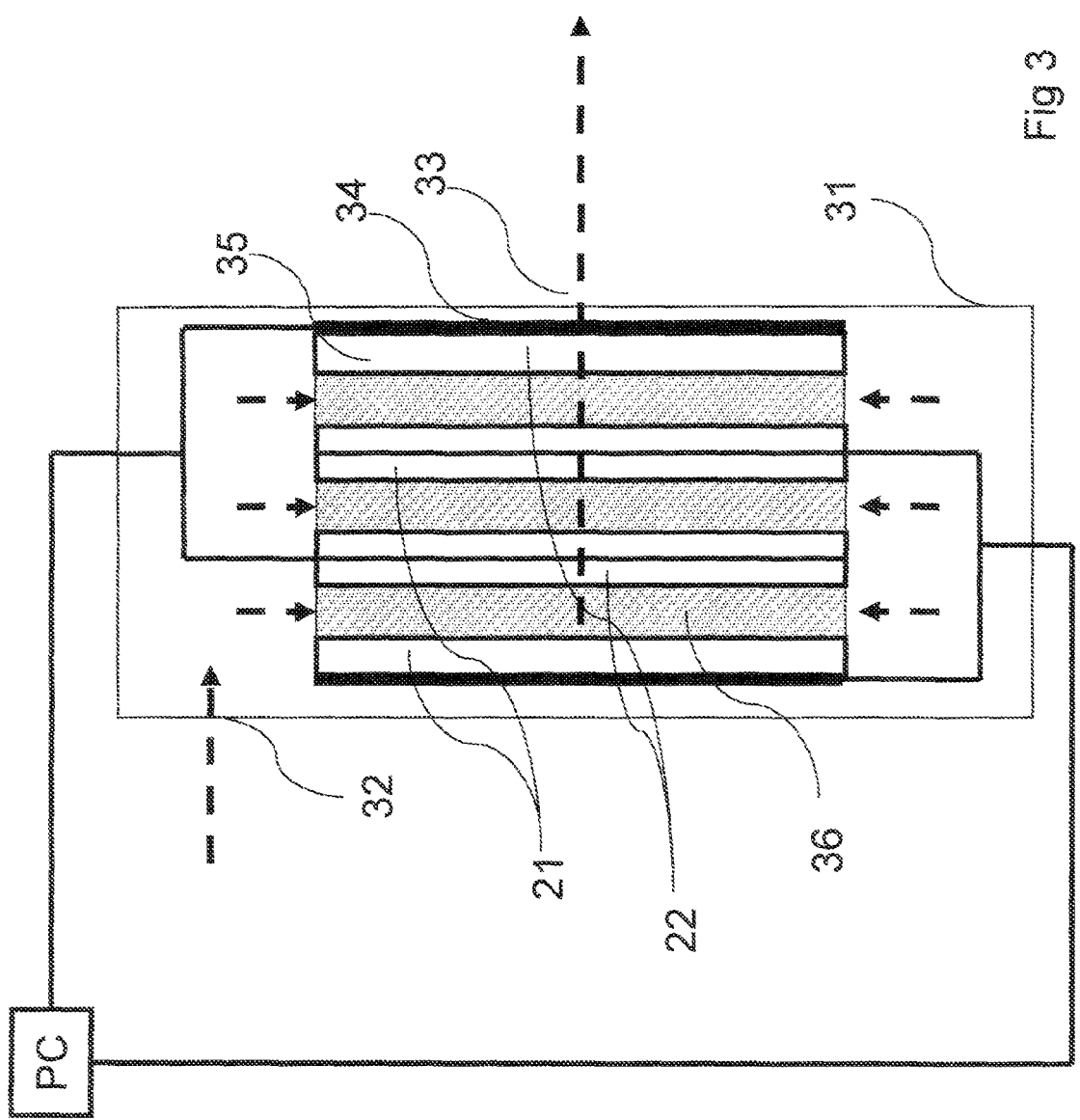

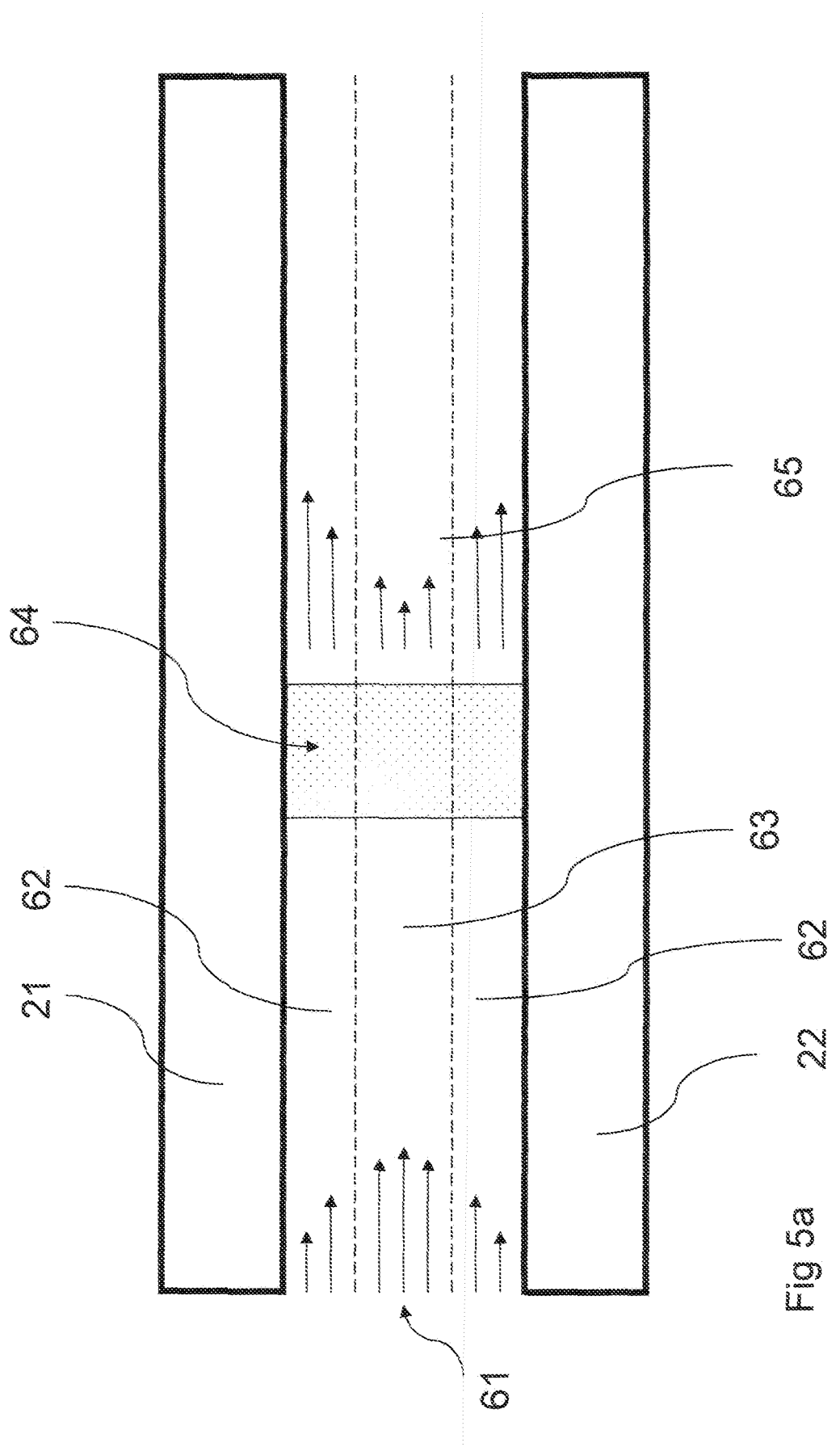

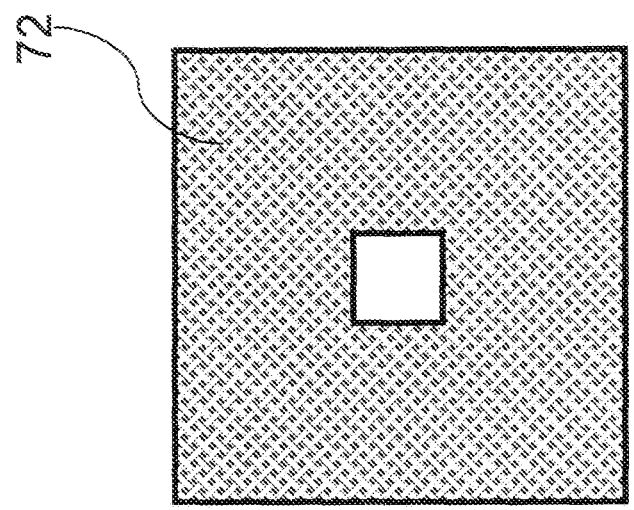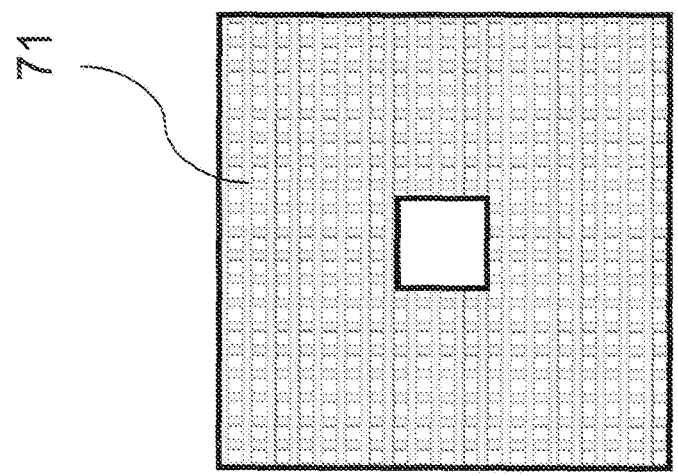
Fig 6

APPARATUS FOR REMOVAL OF IONS, AND A METHOD FOR REMOVAL OF IONS

FIELD

The invention relates to an apparatus to remove ions.

BACKGROUND

In recent years one has become increasingly aware of the impact of human activities on the environment and the negative consequences this may have. Ways to reduce, reuse and recycle resources are becoming more important. In particular, clean water is becoming a scarce commodity. Therefore, various methods and devices for purifying water have been published.

A method for water purification is by capacitive deionization, using an apparatus having a flow through capacitor (FTC) to remove ions in water. The FTC functions as an electrically regenerable cell for capacitive deionization. By charging electrodes, ions are removed from an electrolyte and are held in an electric double layer at the electrodes. The electrodes can be (partially) electrically regenerated to desorb such previously removed ions without adding chemicals.

The apparatus to remove ions comprises one or more pairs of spaced apart electrodes (a cathode and an anode) and may comprise a spacer, the spacer separating the electrodes and allowing water to flow between the electrodes.

The apparatus comprises a housing comprising a water inlet to let water in the housing and a water outlet to let water out of the housing. In the housing of the apparatus, the layers of electrodes (and spacers) are stacked in a "sandwich" fashion by compressive force, normally by mechanical fastening.

SUMMARY

The efficiency of the apparatus during purification is significant because it is indicative of the amount of water that may be purified by the apparatus over a period of time.

It is desirable, for example, to improve the efficiency of the apparatus to remove ions.

According to an embodiment of the invention, there is provided an apparatus to remove ions from water, the apparatus comprising:
  a housing;
  an inlet to let water into the housing;
  an outlet to let water out of the housing;
  a first and second electrode connected to a power controller configured to apply an electrical potential difference between the first and the second electrodes; and
  a velocity adjuster constructed and arranged to adjust a flow velocity of a first portion of the water flowing between the first and second electrodes with respect to a second portion of the water flowing between the first and second electrodes.

According to a further embodiment of the invention, there is provided a method of removal of ions, the method comprising:
  providing an electrical potential difference between first and the second electrodes in a housing;
  allowing water to flow between the first and the second electrodes from an inlet of the housing to an outlet of the housing; and
  adjusting a flow velocity of a first portion of the water with respect to a second portion of the water.

According to a further embodiment of the invention, there is provided an apparatus to remove ions from water, the apparatus comprising:
  a housing;
  an inlet to let water into the housing;
  an outlet to let water out of the housing;
  a first and second electrode connected to a power controller configured to apply an electrical potential difference between the first and the second electrodes; and
  a spacer between the first and second electrodes to allow water to flow in between the first and second electrodes, the spacer comprising a helical structure.

BRIEF DESCRIPTION OF THE FIGURES

Embodiments of the invention will be described, by way of example only, with reference to the accompanying schematic drawings in which corresponding reference symbols indicate corresponding parts, and in which:

FIG. 3 shows a schematic representation of an apparatus to remove ions for use in an embodiment of the invention;

FIGS. 5a-c show schematic cross-sections of a part of an apparatus to remove ions according to an embodiment of the invention;

FIG. 6 shows a schematic cross-section of two spacers;

DETAILED DESCRIPTION

Figure 1:
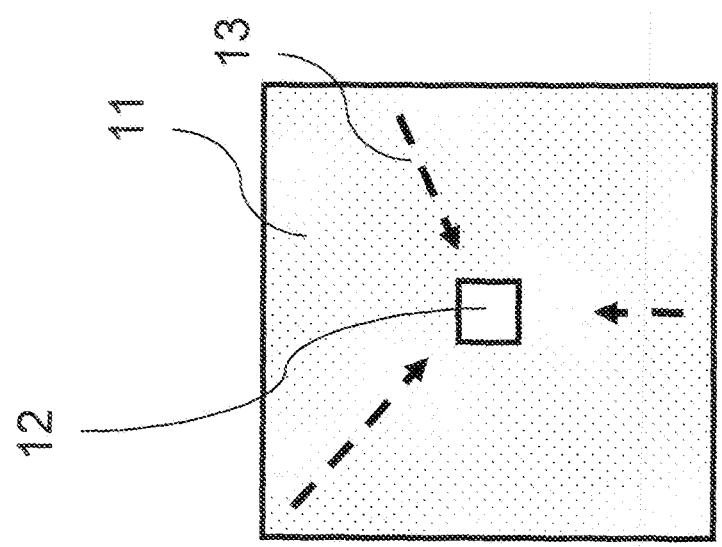
FIG. 1 shows a schematic representation of an embodiment of an electrode for use in an embodiment of the invention.

FIG. 1 shows a schematic cross section of an embodiment of an electrode, being a first or a second electrode. In this example, the electrode 11 has a sheet like shape with a rectangular form, but other shapes, such as a round, polygonal or hexagonal shape are possible. In the electrode a hole 12 is provided, which may have a rectangular shape or another shape, such as a round shape. When electrode 11 is in use, water may be flowing along the electrode from the outer edge(s) towards the hole, as is indicated by the dotted arrows 13 in FIG. 1. Typically, the outer dimensions of the electrode 11 are about 16×16 cm and the dimensions of the hole 12 are about 3×3 cm.

An advantage of a rectangular or a hexagonal shape of the electrode may be that this type of electrode may be efficiently produced with respect to use of material. An advantage of a round shaped electrode with a round hole in the center may be that distance between the outer edge and the inner edge (i.e. the distance the water will flow along the electrode) is substantially constant for all flow directions.

Figure 2:
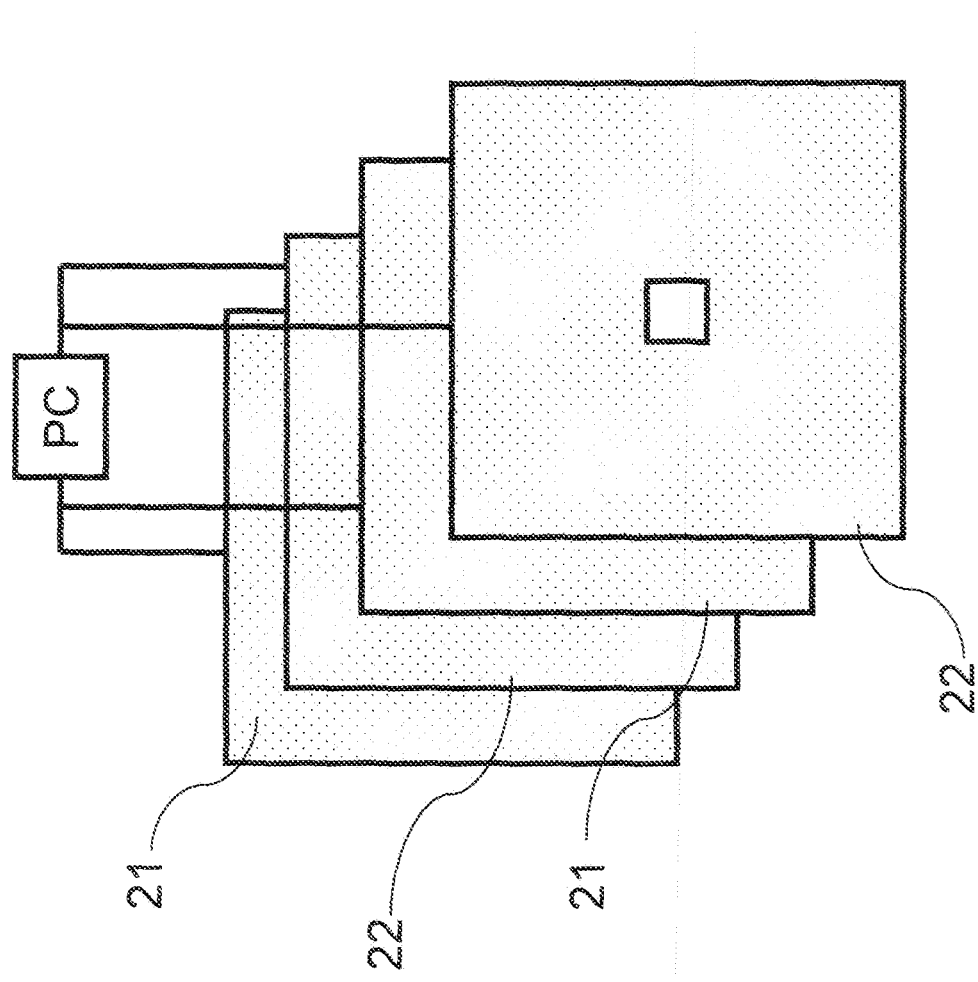
FIG. 2 shows a schematic representation of a stack of electrodes for use in an embodiment of the invention.

FIG. 2 shows a stack of electrodes. The first electrodes 21 and the second electrodes 22 each comprises a current collector, indicated by 34 in FIG. 3, and an ion storage material, indicated by 35 in FIG. 3. The current collector is connected to a power controller PC configured to apply an electrical potential difference between two adjacent electrodes. The ion storage material may store ions that have been removed from the water. The ion storage material may be a so-called high surface area material with more than 500 m²/gr, more than 1000 m²/gr, or more than 2000 m²/gr. The material may comprise activated carbon, carbon aerogel, graphene, carbon nanofiber and/or carbon nanotube on both sides of the electrode which are in contact with the water.

FIG. 3 shows a schematic representation of an apparatus to remove ions for use with an embodiment of the invention. The apparatus has a housing 31 comprising a water inlet 32 and a water outlet 33. During ion removal from the water, the water will flow from the inlet 31 to the outlet 33 through the flow through capacitor (FTC), comprising a pair of a first electrode 21 and an adjacent second electrode 22. The flow of water is indicated by the dotted arrows.

Between two adjacent electrodes a spacer 36 may be provided. The spacer 36 may have a shape as is depicted in FIG. 1. A main function of a spacer is to separate the first electrode from the second electrode, for example by maintaining a substantially constant or fixed distance between the two electrodes.

By applying an electrical potential difference between the first and second electrodes by a power controller PC, for example by applying a positive voltage to the first electrode (the anode) 21 relative to the second electrode (the cathode) 22, the anions of the water flowing through the spacer 36 are attracted to the first electrode 21 and the cations are attracted to the second electrode 22. In this way the ions (anions and cations) will be removed from the water flowing through the spacer 36.

To increase the ion removal efficiency of the apparatus, the electrodes may have a charge barrier, for example an ion exchange membrane or an ion selective membrane. For example, the membrane provided on or to the cathode may be permeable for cations and only substantially allow the transport of cations and substantially block the transport of anions and the membrane provided on or to the anode may be permeable for anions and substantially block the transport of cations.

The electrical potential difference between the anode and the cathode is rather low, for example lower than 2 Volts, lower than 1.7 Volts or lower than 1.4 Volts. A power controller is used to control the conversion of the voltage and electrical current from a power supply to the desired voltage difference over the first and second electrodes.

An element of the efficiency of the apparatus is the ion flux, where the ion flux may be defined as the number of ions removed from the water, for example from the water in a spacer, to one of the electrodes per unit time per projected electrode area.

Figure 4:
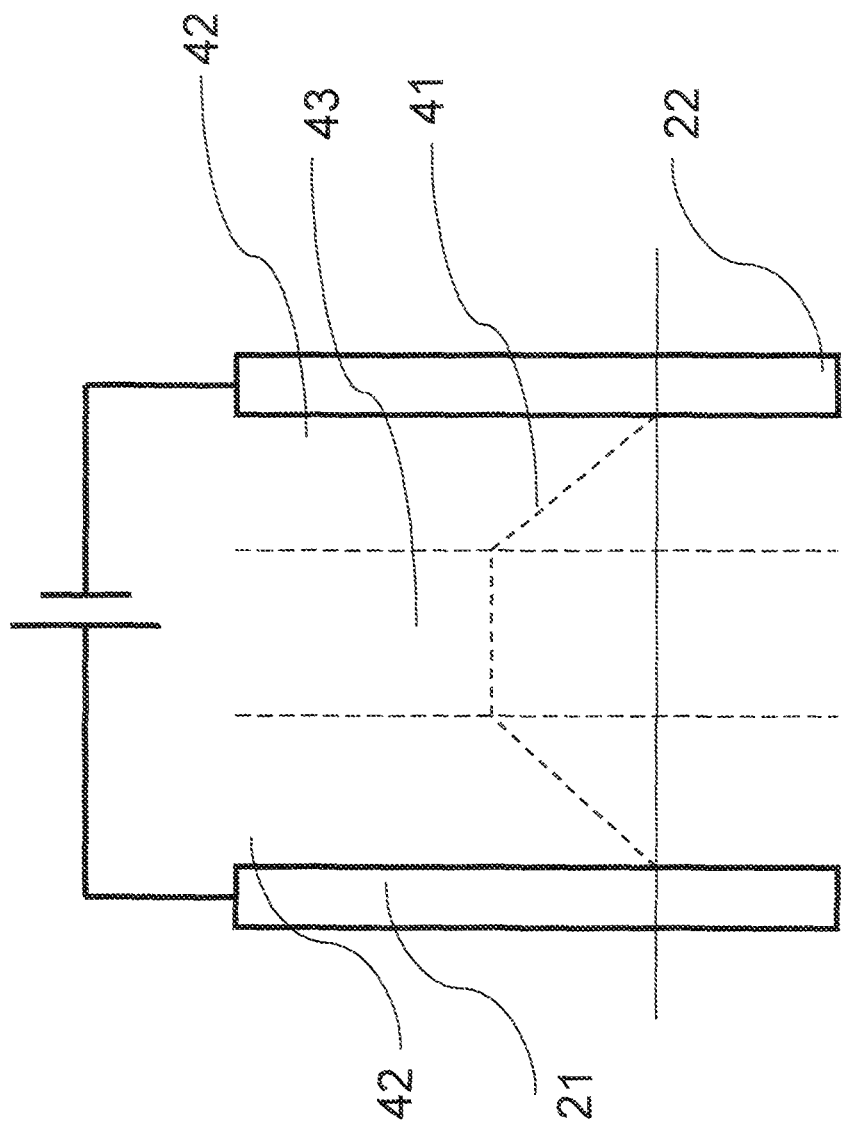
FIG. 4 shows schematically the ion concentration between two electrodes.

FIG. 4 shows two adjacent electrodes in an apparatus to remove ions. The dotted line 41 indicates the concentration of ions in the water flowing between the two electrodes. As can be seen in FIG. 4, near the surface of electrodes the ion concentration is lower than in the center. For example, the ion concentration in the water in region 42 may be lower than the ion concentration in region 43. Although in FIG. 4 only two regions are depicted, it should be understood that the ion concentration may decrease gradually or even linearly with the distance from one of the electrodes and that therefore the choice of regions is arbitrary. Where ion exchange membranes or ion selective membranes are used, which are placed between the electrode and the spacer, a similar situation may occur, where the ion concentration in the water in region 42 may be lower than the ion concentration in region 43.

A low ion concentration close to the electrode (or membrane) may result in a low ion flux to the electrode (or through the membrane) to the electrode. By increasing the ion concentration close to the electrode (or the membrane) the ion flux may be increased, hence improving ion removal efficiency. The ion concentration near the electrodes may be increased for example by mixing the water, by the displacement of the water in a substantially direction perpendicular to electrodes or by increasing the mobility of the ions in the water.

According to an embodiment, the ion improvement device comprises a mixing device. The mixing device may be a spacer with a special structure that causes mixing of the water and which may even cause turbulence in the water. The spacer may have a spiral or a helical structure.

A helical spacer may influence the water flow by forcing the fluid to twist along the spacer. The effect may be a faster local velocity of the water or it may result in that water with higher ion concentration further away from the electrode (or membrane) is brought closer to the electrode (or membrane), which may increase the ion flux towards the electrode. A helical spacer may improve the ion flux by a factor up to two times compared to a non-helical spacer. Furthermore, a helical spacer may increase the mixing of the water where the flow is still laminar. A helical spacer may promote turbulence in the flow channel, which may further improve the mixing of the water.

According to a further embodiment, the mixing device causes an unsteady flow in the water. In an unsteady flow, the flow profile is not constant, i.e. it changes over time. For example the flow velocity at a certain point may change over time and/or its direction.

Additionally or alternatively, the ion flux improvement device may comprise a turbulence creator to create a turbulent flow in the water in the spacer or a recirculation circuit with a pump and a storage facility. In the storage facility, water from the FTC with low ion concentration may be mixed with water in the storage facility with a higher ion concentration. The storage water may be used for other purposes, for example as a swimming pool, or for irrigation.

According to an embodiment the ion flux improvement device comprises a spacer, which is ion-conductive or comprises ion-conductive material. An ion-conductive spacer may improve the ion mobility towards one of the electrodes. An ion-conductive spacer may comprise a membrane (for example: anion exchange membrane, cation exchange membrane, a mosaic membrane (for mixed charges) and/or a bipolar membrane) or an ion exchange resin (for example anion exchange resin, cation exchange resin or mixed ion exchange resin). An ion-conductive spacer allows the passage of charged species such as ions and may increase the mobility of the ions towards one of the electrodes.

FIG. 5a shows a schematic cross section of a first and a second electrode, between which water is flowing. The elements in FIG. 5, such as electrodes 21 and 22 and their sizes and mutual distances are depicted schematically. It may be that the flow of water through the spacer is more or less laminar, e.g. the water flows in more or less constant layers (parallel to the electrodes) without mixing of the water or without water flowing with a direction component perpendicular to the electrodes. In region 61 the flow velocity of a laminar flow parallel to the electrodes is depicted, wherein the length of the straight arrows indicates the velocity of the flow: a longer arrow indicates a higher velocity.

According to an embodiment, the ion improvement device may comprise a velocity adjuster 64 configured to adjust a flow velocity of a first portion of the water with respect to a second portion of the water, wherein, in use i.e. during ion removal from the water, in the first portion an ion concentration is higher than in the second portion. If a portion of water experiences the electrical potential difference for a longer period of time (i.e. its flow velocity is lower) than another portion of water, then at the same ion concentration in the water the number of ions removed from this portion will be higher than from another portion of water that experiences the electrical potential difference for a shorter period of time.

Velocity adjuster 64 may be located in the spacer, along the spacer, or outside the spacer or it may be incorporated in the spacer. Without the velocity adjuster 64 the flow in the flow channel will follow a parabolic ("Poisseuille") profile with a maximum flow velocity in the center of the flow channel and zero flow at both electrode surfaces. The velocity adjuster 64 is constructed to change the velocity of the water in such a way, that a portion of the water flowing further away from one of the electrodes (for example in region 63) is flowing slower relative to a portion flowing closer to one of the electrodes (for example in region 62). Region 65 depicts a possible effect on the flow velocity of the water, wherein the length of the straight arrows indicates the absolute velocity of the flow: a longer arrow indicates a higher velocity and the orientation of the arrow indicates the direction of the flow. In FIG. 5 a situation is depicted where the velocity adjuster 64 has reduced the velocity of the water so much that the velocity in the center of the flow channel has become lower than closer to the electrodes. Nevertheless, in another embodiment of the velocity adjuster 64, a lower reduction of the flow velocity in the center may be achieved, where the flow will only gradually decrease from the center to close to the electrodes. In another embodiment the velocity adjuster may cause the velocity to be more uniform inside the spacer, where the flow velocity will be substantially independent from the distance from the electrode.

The velocity adjuster 64 may comprise a porous material, wherein the flow resistance in the center of the velocity adjuster is larger than in one or more edges, causing the velocity of the water passing through the center of the velocity adjuster 64 (for example in region 63) to be reduced compared to the water passing through the edge of the velocity adjuster 64 (for example in region 62). The flow resistance of this velocity adjuster may be continuously increasing from an edge, near one of the electrodes, towards the center of the velocity adjuster, i.e. the central axis of the spacer. For example, the porosity of the velocity adjuster 64 may be varied from a value larger than 70%, larger than 80%, or larger than 90% close to an electrode (e.g. region 62) to a value of smaller than 70%, smaller than 60% or smaller than 50% towards the center of the velocity adjuster (e.g. region 63). Porosity may be measured as a percentage of the volume of voids over the total volume.

The velocity adjuster 64 for use in the apparatus to remove ions according to an embodiment of the invention may comprise a spacer with multiple layers between the electrodes and the layer(s) close to the electrode(s) may have a low flow resistance and the layer(s) further away from the electrode(s) a relatively higher flow resistance. The low flow resistance may cause a higher velocity of the water close to an electrode and the higher flow resistance may cause a lower velocity of the water further away from the electrode. Without the velocity adjuster 64 less ions will be removed from the water in the center of the flow channel or spacer, because these ions will have to migrate over a larger distance whereas the residence time of the ion in the center of the flow channel or spacer is lower than that closer to an electrode. Since the water further away from an electrode will be less easily de-ionized than the water closer to the electrode it is advantageous to have a lower velocity to the water further away from the electrode so that the water stays longer between the electrodes resulting in more time for the electrodes to attract the ions. Water close to an electrode may be relatively quickly de-ionized because of the close proximity of the electrode and therefore shorter migration distance for the ions and this water may therefore stay a relatively shorter time between the electrodes. The layers in the spacer may comprise a porous material with a low flow resistance in a first direction and a higher flow resistance in a second direction. This may be achieved by orienting fibers in the spacer substantially parallel to the first direction and/or perpendicular to the second direction. The layer in the spacer close to an electrode may be oriented such that the first direction is substantially equal to the water flow direction. The water may therefore experience a low flow resistance close to the electrode and the speed of the water may therefore be relatively high. A layer in the spacer further away from the electrode is oriented such that the second direction is substantially equal to the water flow direction so that the water further away from the electrode experiences a higher resistivity resulting in a lower velocity of the water. The thickness of the spacer with the velocity adjuster may be 20-300 micrometers, 40-200 micrometers, 60-150 micrometers or 70-120 micrometers.

A further example of a velocity adjuster comprises a material that closes off the spacer but has several small channels in the longitudinal direction of the spacer through which water may pass from one side to the other. The overall cross-section of the channels in the region near an edge may be larger than the overall cross-section of the channels in the central region of the velocity adjuster 64.

Figure 5B:
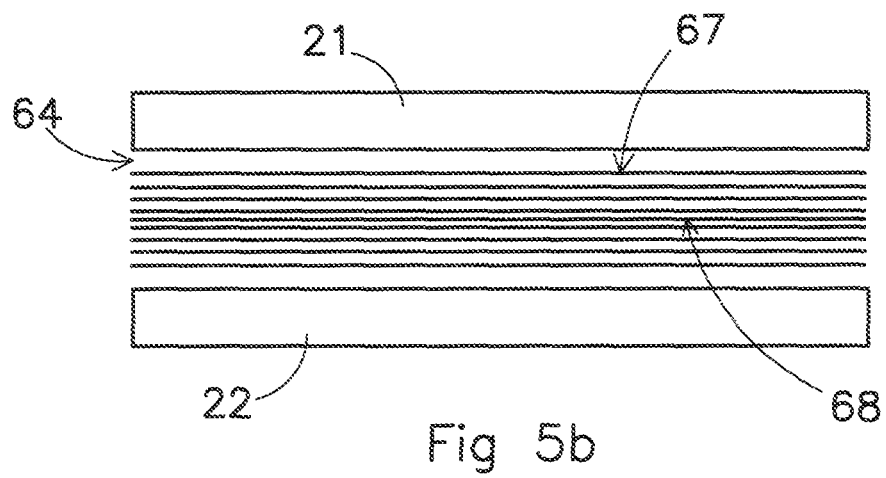

FIG. 5b is an example of such a velocity adjuster 64 for use in an apparatus to remove ions according to an embodiment of the invention. The velocity adjuster 64 has channel walls creating small channels 67, 68 in the spacer 64. The channel walls are permeable for water and/or ions flowing through them but they create a resistivity for the water flow. As depicted the channel walls are substantially parallel to the electrodes but they may be more randomly oriented. A small channel 68 in the middle of the spacer creates a higher flow resistivity than a larger small channel 67 closer to an electrode. The flow velocity of the water flowing in the flow direction substantially parallel to the channel walls is thereby adjusted so that the flow velocity is lower in the middle of the spacer than the flow velocity closer to the electrodes 21, 22. The flow resistance of the small channels may be continuously increasing from a larger small channel 67 near the edge, near one of the electrodes 21, 22, towards the middle, i.e. the central small channel 68 of the spacer. The water further away of an electrode may get a lower velocity so that it stays longer between the electrodes and there is more time by the electrodes 21, 22 to attract the ions. Water close to an electrode may be relatively quickly de-ionized because of the close proximity of the electrode and may therefore be for a relatively short time between the electrodes. The water further away from the electrode may because of the higher flow resistance further away from the electrode also be moved towards an electrode so that the ions are more easily attracted to an electrode.

Figure 5C:
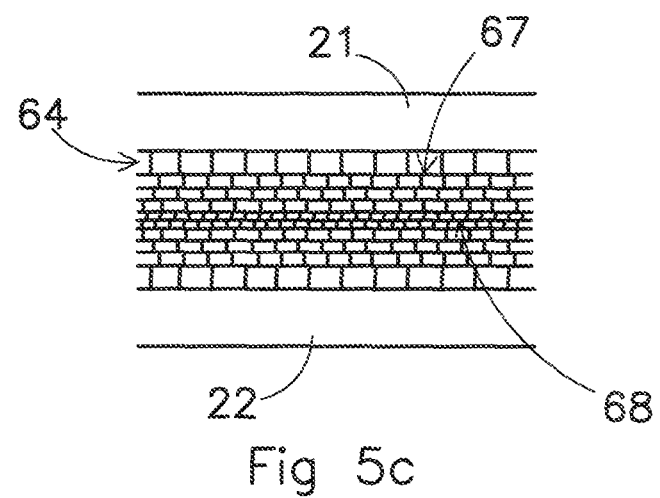

FIG. 5c discloses a cross-section of the velocity adjuster 64 of FIG. 5b perpendicular to the flow direction. FIG. 5c discloses that the small channels have a total cross section which is decreasing close to the center 68 of the flow channel and which is increasing closer 67 to the electrodes 21, 22.

Another example of a velocity adjuster may be a shifted spacer, as is depicted in FIG. 6. The spacer may comprise a grid structure 71. The grid structure will influence the velocity of the water flowing through the spacer. It may also cause mixing of the water or cause a displacement of the water in a direction perpendicular to electrodes. By shifting or rotating the orientation of the grid with respect to the electrode, these effects may be further optimized. FIG. 6 shows a shifted grid structure 72. The shift or rotation of the orientation may be around 45 degrees, where the threads of the spacer are at an angle of around 45 degrees with respect to the side of one of the electrodes, as can be seen from FIG. 6. Or in other words, the threads of the spacer are substantially parallel to the diagonal of the electrode. Note that the dimensions of the spacer are about the same as the dimension of the electrode shown in FIG. 1 or may be a bit larger, for example 17×17 cm.

Figure 7:
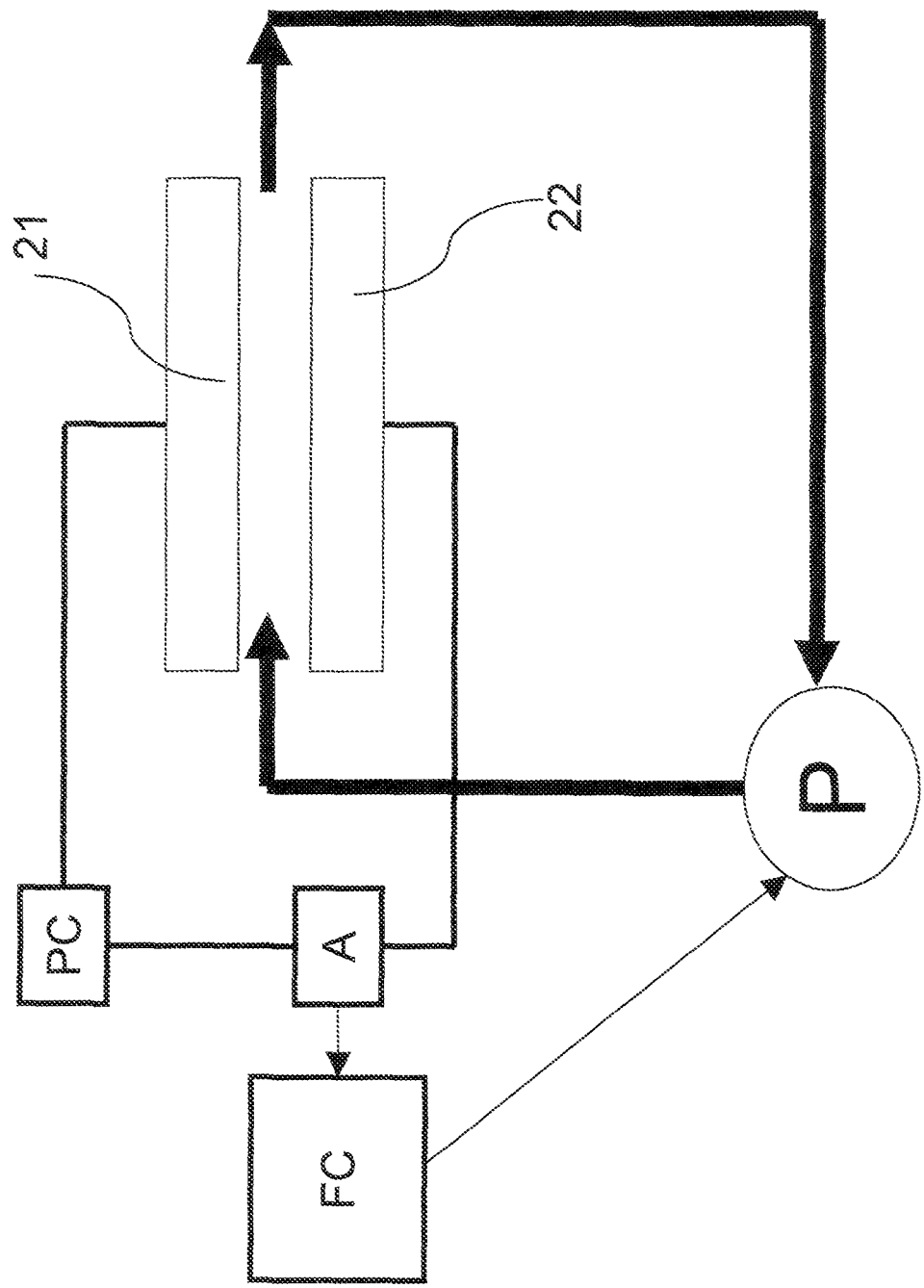
FIG. 7 shows a schematic arrangement of an apparatus to remove ions for use in an embodiment of the invention.

FIG. 7 shows another embodiment of an ion flux improvement device, comprising an electrical current measurement device A and a flow controller FC. The current measurement device A measures the current flowing to the first electrode 21 or to the second electrode 22. The ion flux is a function of the electrical current and the electrical current may thus be used as a measure for the ion flux. The current measurement device A provides a current signal to the flow controller FC, which may adjust the water flow depending on the measured electrical current. The flow controller FC may be configured to adjust the flow velocity of the water, for example by controlling the pump P, via a control signal. In this way, the ion flux may be controlled via the flow controller.

By increasing the flow velocity, the ion flux may increase to one of the electrodes (or to the ion exchange membrane or ion selective membrane), because of an increased ion concentration nearby, for example in region 42 in FIG. 4.

However, at a high flow velocity, a further increase of the flow may not result in an increased ion flux. An optimum ion flux to the electrode (or membrane) may be obtained when the percentage of ions removed from the water per cycle is relatively low, for example below 80%, below 60%, below 40% or below 20%. In one cycle the water flows once between two FTC electrodes.

A high ion flux may thus be obtained for example at a flow velocity higher than 1 liter/m$^2$ projected electrode area/min, or higher than 2 liters/m$^2$ projected electrode area/min or even higher than 3 liters/m$^2$ projected electrode area/min or even higher than 4 liters/m$^2$ projected electrode area/min.

Although increasing the flow velocity may cause the number of ions or percentage of ions removed from the water per cycle to be lower, the ion flux, which is defined per unit time per projected electrode area, may increase because the number of cycles per unit time may also increase with higher flow velocity.

In an embodiment, the ion flux improvement devices may comprise a deionization rate measurement device to measure the deionization rate (i.e. the percentage of ions removed from the water) per cycle. The deionization rate measurement device may comprise two ion concentration measurement devices, one measuring the ion concentration of the water before the water flows between the electrodes and one measuring the ion concentration of the water after flowing between the electrodes. The deionization rate measurement device may comprise only one of these two ion concentration measurement devices and an electrical current measurement device as described above. The deionization rate measurement device may calculate the deionization rate on the basis of one measurement of the ion concentration and the measurement of the current flowing to one of the electrodes. The deionization rate measurement device may provide a deionization rate signal indicating the measured or calculated deionization rate.

The ion flux improvement device may further comprise a flow controller to control the water flow in response to the deionization rate signal. In this way, it is possible to (automatically) maintain a certain deionization rate per cycle by adjusting the flow velocity, for example a deionization rate per cycle below 20%, where only up to 20% of the ions in the water are removed per cycle. It is possible to increase the percentage of ion removal per cycle, for example from 20% in the first cycle to 40% in the second cycle to 60% in the third cycle and to 80% in the fourth cycle and effectively almost complete removal in the fifth cycle.

Using the above mentioned device to remove salt from water, the ion flux may be higher than 0.5 grams salt per m$^2$ projected electrode area per min, higher than 1.0 gram salt per m$^2$ projected electrode area per min, higher than 1.5 grams salt per m$^2$ projected electrode area per min or higher than 2.0 grams salt per m$^2$ projected electrode area per min.

Increasing the flow velocity may cause the flow regime to change from a laminar flow to an unsteady or turbulent flow. In the laminar regime the pressure drop shows a linear relationship with the flow velocity. However, in an unsteady or turbulent regime, the pressure drop over the spacer or flow channel is no longer linear with the flow velocity, but increases more rapidly with the flow. This involves more pumping energy. To prevent the flow from changing from laminar to (semi) turbulent flow, the pressure drop should be limited, for example in the range of 0-20 bar per m$^2$ projected electrode area, in the range of 15-18 bar per m$^2$ projected electrode area or in the range of 2-10 bar per m$^2$ projected electrode area. The pressure drop may be limited to 0.1-20 bar per m$^2$ projected electrode area or 1-15 bar per m$^2$ projected electrode area.

Figure 8A:
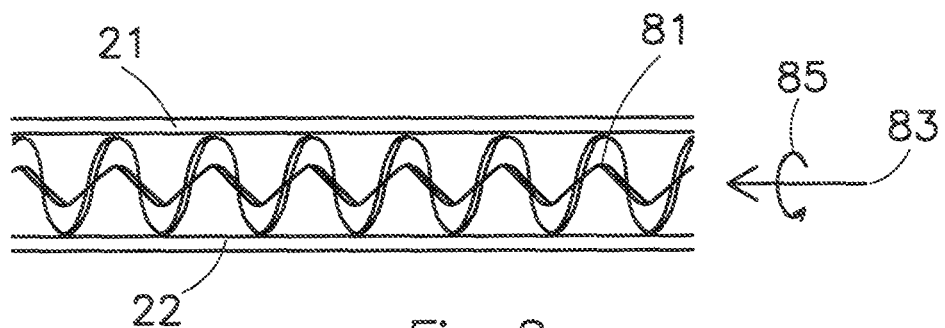
FIGS. 8a to 8c show apparatus to remove ions according to an embodiment of the invention.

FIG. 8a discloses a cross-section of an apparatus to remove ions according to a further embodiment of the invention comprising a first and second electrode 21, 22 and a spacer between the first and second electrodes 21, 22. The spacer may have a helical structure 81. The thickness of the spacer with the helical structure 81 may be 20-300 micrometers, 40-200 micrometers, 60-150 micrometers or 70-120 micrometers. The helical structure 81 may influence the principal water flow 83 by forcing the fluid to twist along the helical structure in a direction 85. The effect may be a faster local velocity of the water or it may result in that water with a higher ion concentration further away from the electrode (or membrane) may be brought closer to the electrode (or membrane), which may increase the ion flux towards the electrode. A helical structure in the spacer may improve the ion flux by a factor up to two times compared to a spacer without a helical structure. Furthermore, a helical structure may increase the mixing of the water where the flow is still laminar. A helical structure may promote turbulence in the flow channel, which may further improve the mixing of the water. The electrodes may comprise a flat surface and multiple helical structures may be sandwiched between the flat surface of the first electrode and the flat surface of the second electrode. One of the functions of the spacer is to keep the surfaces of the two electrodes at a substantial constant distance of, for example, between 0.02 and 0.5 mm. This is significant because if the distance between the electrodes is irregular then this may affect the flux of ions towards the electrode, with lower fluxes where the spacer is thicker. The helical structure 81 may provide seven twists over the length of the helical structure. Seven twists would assure that the water is flowing along each electrode at least seven times. The porosity of the spacer with the helical structure may be larger than 50%, larger than 60%, larger than 70% or larger than 90%.

Figure 8B:
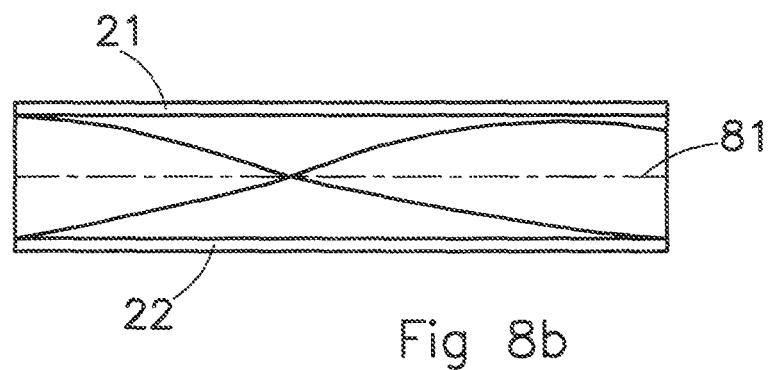

FIG. 8b discloses a cross-section of an apparatus to remove ions according to a further embodiment of the invention comprising a first and second electrode 21, 22 and a spacer between the first and second electrodes 21, 22. The spacer has a helical structure 81 having a less steep torsion and only half a twist in total. An advantage may be that the flow resistance in such a case is lower and that the water will rotate along an electrode. An optimum between low flow resistance and sufficient interaction with the electrodes may be with a number of twists between 0.5 and 7, between 1 and 5 or between 2 and 4.

Figure 8C:
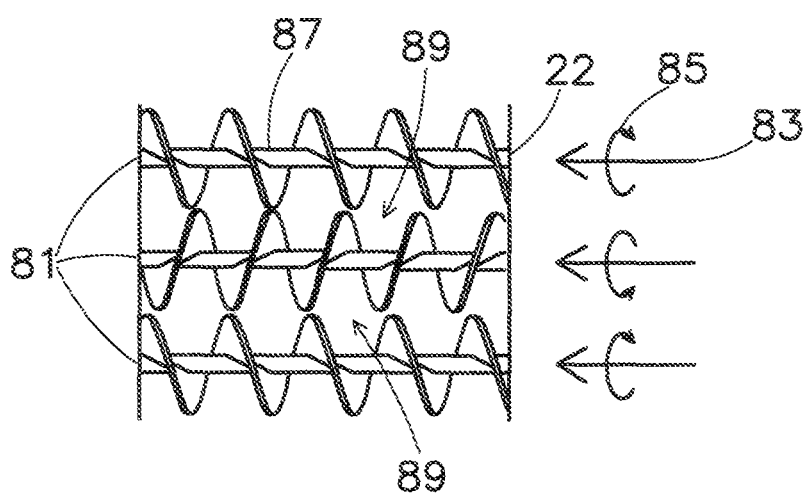

FIG. 8c discloses a cross-section of an apparatus to remove ions according to a further embodiment of the invention. FIG. 8c gives a top view of a spacer with one of the electrodes removed so that multiple adjacent helical structures 81 on top of the flat surface of the electrode 22 can be seen. The helical structures have four and half twists and the twists of two adjacent helical structures 81 are opposite. The helical structures 81 cause the water to twist 85 around the principal flow direction 83 of the water and since two adjacent helical structures 81 have an opposite twist the water in between the helical structures 81 move in the same direction substantially perpendicular to the principal flow direction 83. This may improve the flow of the water towards an electrode at a position 89 in between the helical structures 81. Since two adjacent helical structures are co-operating there may be a relatively low increase of the flow resistance.

The twist direction of two adjacent helical structures 81 may also be the same which causes turbulence in between the helical structures and improved mixing. The helical structures in FIG. 8c have a support 87 in the center. This forces the water out of the center of the helical structure towards the electrodes where the water is de-ionized.

Any embodiment of the above described apparatus to remove ions may be used for the removal of ions from water in a swimming pool, from water in a storage tank or from water in a factory plant or from ground water.

Figure 9A:
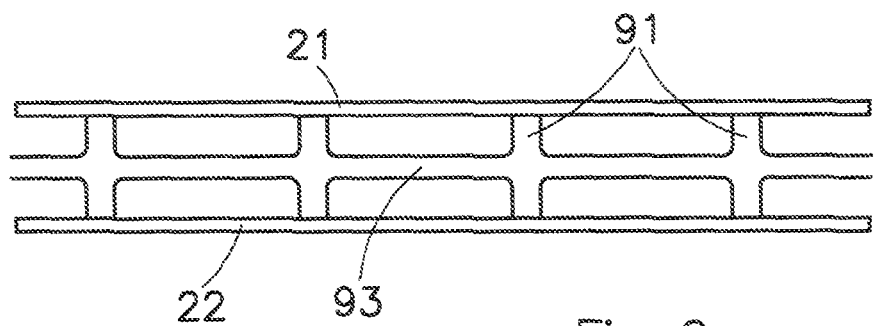
FIGS. 9a to 9e show apparatus to remove ions according to an embodiment of the invention.

FIG. 9a discloses a cross-section of an apparatus to remove ions according to a further embodiment of the invention comprising a first and second electrode 21, 22 and a spacer between the first and second electrodes 21, 22. The spacer may have a structure as a pillar 91 to keep the electrodes at a substantially fixed distance. The thickness of the spacer with the pillar structure may be 20-300 micrometers, 40-200 micrometers, 60-150 micrometers or 70-120 micrometers. The pillar structure 91 may be produced in a netting structure or framework 93 to form a layer which may form the spacer. The spacer is electrically insulating and at the same time open enough for water and ions to move through. The term pillar is to be interpreted as a structural element that keeps the first and second electrodes at a distance. The netting 93 keeps the pillar 91 substantially perpendicular compared to the main direction of the spacer. The netting framework causes a higher flow resistivity in the middle of the flow channel between the electrodes 21, 22 thereby forcing the water in the flow channel to move closer to the first or second electrode resulting in increased de-ionization of water. The netting framework and the pillars may cause better mixing of the water in the flow channel, which may increase the ion flux towards an electrode. An advantage of the spacer comprising pillars and a netting is that it creates a very open spacer (particularly in the flow direction) with a low flow resistivity, which may result in a lower pressure drop over the channel, or increased flow in the flow channel and it may also result in a reduced risk of fouling of the spacer. The porosity of the spacer with the pillar structure may be larger than 50%, larger than 60%, larger than 70% or larger than 90%.

The electrodes may have a flat surface and multiple pillars held by the netting may be sandwiched between the flat surface of the first electrode and the flat surface of the second electrode. One of the functions of the spacer is to keep the surfaces of the two electrodes at a substantially constant or fixed distance of, for example, between 0.02 and 0.5 mm. This is significant because if the distance between the electrodes is irregular, then the ion flux towards the electrodes may be affected.

Figure 9B:
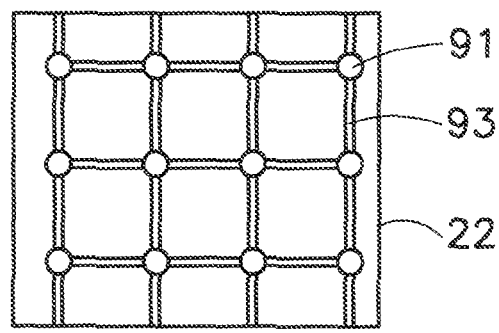

FIG. 9b gives a top view of a part of a spacer with one of the electrodes removed so that the multiple adjacent pillars 91 on top of the flat surface of the electrode 22 which are held in the netting 93 can be seen. The netting 93 provides support over the full surface of the electrode so that it keeps the pillars 91 substantially perpendicular to the surface of the electrode as well as at a substantially fixed distance with respect to each other.

Figure 9C:
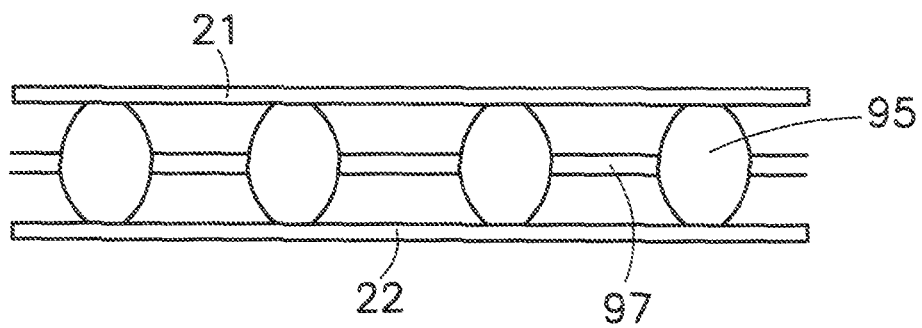

FIG. 9c discloses a cross-section of an apparatus to remove ions according to a further embodiment of the invention. The pillar 95 in this embodiment may comprise a spherical, elliptical or egg shape so that the pillar structure may have a thicker middle portion so as to provide for a higher flow resistivity in the middle of the flow channel in order to force the water flowing in the center part of the flow channel between the electrodes 21, 22 in the direction of an electrode. At the same time the flow velocity in the center of the flow channel may be reduced compared to that of the water flowing closer to the first and/or second electrode. The pillar may have a conical or rhombus structure, which is thicker in the middle than at an edge. The spacer may comprise a netting 97 to keep the pillars 95 in position. The netting of FIG. 9c may be constructed similarly as the netting in FIG. 9b.

Figure 9D:
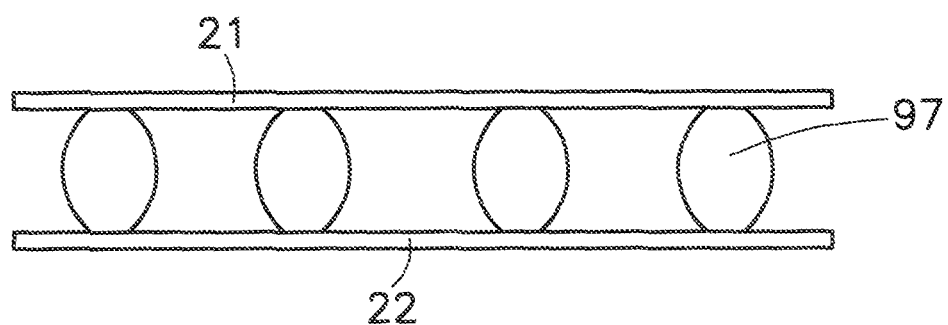

FIG. 9d discloses a cross-section of an apparatus to remove ions according to a further embodiment of the invention. This embodiment is the same as the embodiment of FIG. 9c except that the netting is omitted. The pillars 97 may be spherical, elliptical, conical, rhombus or ball shaped so as to provide a higher flow resistivity further away from the electrode 21, 22 and hence increasing the residence time of the water in the center of the channel compared to that of an edge of the spacer. The pillars 97 may be attached to the electrodes so that the electrodes keep the pillars substantially perpendicular to the electrode surface by, for example, a glue or a specific coating. The pillars may also be produced by printing the pillars on an electrode with, for example, a 3D printer and subsequently providing another electrode on top of the already printed electrode. The pillars may be printed on top of an additional layer, for example an ion exchange membrane, which may be placed on top of the electrode as a separate layer or as a coating or laminate.

Figure 9E:
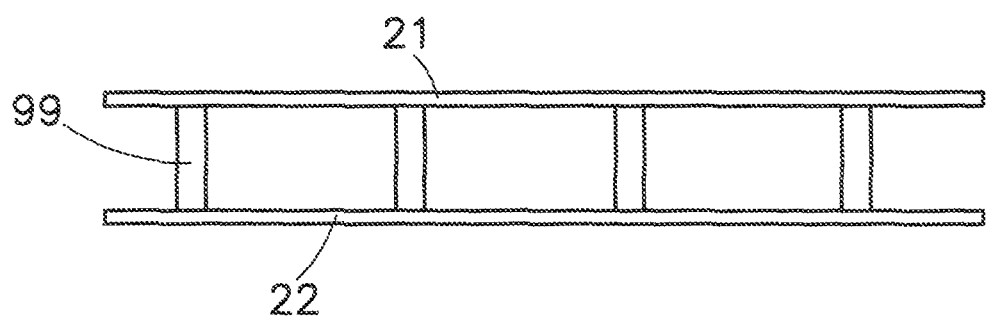

FIG. 9e discloses a cross-section of an apparatus to remove ions according to a further embodiment of the invention. This embodiment is the same as the embodiment of FIGS. 9a and 9b except that the netting is omitted. The pillars 99 may be connected to the electrodes so that the electrodes keep the pillars substantially perpendicular to the electrodes. The pillars may be produced by printing the pillars on an electrode with, for example, a 3D printer.

An advantage of the pillars without a netting is that a very open spacer may be created in which the flow resistivity is reduced as well as the risk of fouling is reduced.

Furthermore, the description also explains how ions may be removed by providing a method comprising: providing an electrical potential difference between a first and a second electrode in a housing; allowing water to flow between the first and second electrodes from an inlet in the housing to an outlet in the housing; and improving the ion flux from the water to the first and/or second electrode.

An apparatus to remove ions from water is described, the apparatus may comprise a housing, an inlet to let water in the housing, an outlet to let water out of the housing, a first and a second electrode connected to a power controller configured to apply an electrical potential difference between the first and the second electrodes, and an ion flux improvement device configured to improve the ion flux from the water flowing between the first and second electrodes to one of the first and the second electrode. The ion flux improvement device may comprise a mixing device constructed and arranged to mix the water, or an unsteady flow creator configured to create an unsteady flow in the water, or a turbulence creator configured to create turbulence in the water, or a spacer between the first and second electrodes configured to allow water to flow in between the first and second electrodes, the spacer having a spiral structure to change a flow profile of the water. The mixing device may comprise a recirculation circuit constructed and arranged to recirculate water flowing between the first and second electrodes, the recirculation circuit may comprise a pump and a storage facility. The ion flux improvement device may comprise a spacer between the first and second electrodes to allow water to flow in between the first and second electrodes, the spacer may comprise ion-conductive material to increase a mobility of ions towards the first electrode or the second electrode. The ion flux improvement device may comprise a spacer between the first and second electrodes to allow water to flow in between the first and second electrodes, the first and second electrodes and the spacer may have a substantially rectangular sheet-like shape, in which a hole may be provided; and the spacer may comprise a grid structure and an orientation of the grid structure may be rotated with respect to a straight side of the first and second electrodes by at least 30 degrees, in the range of 30-50 degrees or about 45 degrees. The ion flux improvement device may comprise a velocity adjuster constructed and arranged to adjust a flow velocity of a first portion of the water with respect to a second portion of the water, wherein, in use, i.e. when removing ions from water, in the first portion an ion concentration is higher than in the second portion. The ion flux improvement device may comprise an electrical current measurement device arranged and constructed to measure an electrical current between the first and the second electrodes and to provide a current signal indicating the electrical current; and a flow controller arranged and constructed to receive the current signal and adjust a flow velocity at which the water is flowing between the first and second electrodes in response to the current signal. The flux improvement device may comprise a deionization rate measurement device arranged and constructed to measure a deionization rate per cycle of the water flowing between the first and the second electrodes and provide a deionization rate signal indicating the deionization rate; and a flow controller arranged and constructed to receive the deionization rate signal and adjust a flow velocity at which the water is flowing between the first and second electrodes in response to the deionization rate signal. The flow controller may be arranged and constructed to maintain the deionization rate below 60%, below 40% or below 20% of ions removed per cycle. Alternatively, the percentage of ion removal per cycle may be increased for example from 20% in the first cycle to 40% in the second cycle to 60% in the third cycle and to 80% in the fourth cycle and effectively almost complete removal in the fifth cycle. The flow controller may be arranged and constructed to maintain the flow velocity higher than 2 liters/m$^2$ projected electrode area/min, higher than 3 liters/m$^2$ projected electrode area/min, or higher than 4 liters/m$^2$ projected electrode area/min. The flow controller may be constructed and arranged to provide a control signal to a pump, the pump being constructed and arranged to receive the control signal and pump the water between the first and second electrodes with a flow velocity in response to the control signal.

Embodiments may also be provided in the following numbered clauses:

1. An apparatus to remove ions from water, the apparatus comprising:
   a housing comprising:
   an inlet to let water into the housing,
   an outlet to let water out of the housing, and
   a first and a second electrode connected to a power controller configured to apply an electrical potential difference between the first and the second electrodes;
   a velocity adjuster constructed and arranged to adjust a flow velocity of a first portion of the water flowing between the first and second electrodes with respect to a second portion of the water flowing between the first and second electrodes.

2. The apparatus according to clause 1, wherein the velocity adjuster is constructed and arranged to adjust the flow velocity of the first portion of the water to be reduced compared to the flow velocity of the second portion of the water.

3. The apparatus according to clause 1 or clause 2, wherein the first portion of the water is flowing further away from the first electrode and/or the second electrode than the second portion of the water.

4. The apparatus according to any of clauses 1-3, wherein the first portion of the water is flowing through the center of the velocity adjuster.

5. The apparatus according to any of clauses 1-4, wherein the second portion of the water is flowing through an edge of the velocity adjuster.

6. The apparatus according to any of clauses 1-5, wherein the second portion of the water is flowing closer to the first electrode and/or the second electrode in the velocity adjuster.

7. The apparatus according to any of clauses 1-6, wherein the velocity adjuster comprises a material with a flow resistance which may be adjusted to adjust the flow velocity of the water.

8. The apparatus according to any of clauses 1-7, wherein the velocity adjuster comprises a porous material, wherein a flow resistance in the center of the velocity adjuster is larger than closer to an edge, causing the velocity of the water passing through the center of the velocity adjuster to be reduced compared to the water passing through the edge of the velocity adjuster.

9. The apparatus according to any of clauses 1-8, wherein the velocity adjuster comprises a porous material, where the porosity increases from the center of the velocity adjuster to the first electrode and/or the second electrode.

10. The apparatus according to any of clauses 1-9, wherein the flow resistance of the velocity adjuster continuously increases from near the first electrode and/or the second electrode, towards the center of the velocity adjuster.

11. The apparatus according to any of clauses 1-10, wherein the velocity adjuster is provided along the spacer, outside the spacer or incorporated in the spacer.

12. The apparatus according to any of clauses 1-11, wherein the velocity adjuster comprises a spacer having a grid structure which is shifted and/or rotated with respect to the first electrode and/or the second electrode to adjust the velocity of the water flowing through the spacer.

13. The apparatus according to any of clauses 1-12, wherein the velocity adjuster comprises a spacer with multiple layers between the first and second electrodes and a layer close to the first electrode and/or the second electrode has a low flow resistance and a layer further away from the first electrode and/or the second electrode has a relatively high flow resistance.

14. The apparatus according to clause 13, wherein the layers comprise a porous material with a low flow resistance in a first direction and a higher flow resistance in a second direction, where a layer close to the first electrode and/or the second electrode is oriented such that the first direction is substantially equal to the water flow direction.

15. The apparatus according to clause 14, wherein a layer further away from the first electrode and/or the second electrode is oriented such that the second direction is substantially equal to the water flow direction.

16. The apparatus according to clause 1, wherein the velocity adjuster comprises a material having small channels and the cross-section of a channel in a region closer to the first electrode and/or the second electrode may be larger than the cross-section of a channel in the center of the velocity adjuster.

17. The apparatus according to clause 16, wherein the velocity adjuster comprises a material that closes off the spacer but has several small channels in the longitudinal direction of the spacer through which water may pass from one side to the other and the total cross-section of the channels in the region near an edge may be larger than the total cross-section of the channels in a central region of the velocity adjuster.

18. A method to remove ions, the method comprising:
providing an electrical potential difference between a first and the second electrode in a housing;
allowing water to flow between the first and second electrodes from an inlet of the housing to an outlet of the housing; and
adjusting a flow velocity of a first portion of the water with respect to a second portion of the water.

19. The method according to clause 18, wherein the flow velocity of the first portion of the water is lower than the flow velocity of the second portion of the water and the first portion of the water is flowing further away from the first electrode and/or the second electrode than the second portion of the water.

20. An apparatus to remove ions from water, the apparatus comprising:
a housing comprising:
an inlet to let water into the housing,
an outlet to let water out of the housing, and
a first and a second electrode connected to a power controller configured to apply an electrical potential difference between the first and the second electrodes;
a spacer between the first and second electrodes to allow water to flow in between the first and second electrodes, the spacer comprising a helical structure.

21. The apparatus according to clause 20, wherein the first and second electrodes each comprise a substantially flat surface at a substantially constant distance from each other.

22. The apparatus according to clause 21, wherein the helical structure is sandwiched in between the flat surface of the first and second electrodes.

23. The apparatus according to any of clauses 20-22, wherein the helical structure forces the water to twist along the helical structure.

24. The apparatus according to any of clauses 20-23, wherein the helical structure forces the water further away from the first electrode and/or the second electrode to a position closer to the first electrode and/or the second electrode.

25. The apparatus according to any of clauses 20-24, wherein the helical structure creates turbulence in between the first and second electrodes to improve mixing of water.

26. The apparatus according to any of clauses 20-25, wherein the spacer comprises multiple helical structures.

27. The apparatus according to any of clauses 20-26, wherein the spacer comprises multiple helical structures and the rotational direction of adjacent helical structures is opposite.

28. The apparatus according to any of clauses 20-27, wherein the water flow through the spacer has a principal direction substantially parallel to the first electrode and/or the second electrode and the helical structure is oriented substantially parallel to the principal direction.

29. The apparatus according to clause 28, wherein the helical structure forces the water to rotate in direction substantially perpendicular to the principal direction.

30. The apparatus according to clause 29, wherein two adjacent helical structures rotate the water in opposite direction.

31. The apparatus according to clause 29, wherein two adjacent helical structures rotate the water in the same direction.

32. The apparatus according to any of clauses 20-31, wherein the helical structure comprises a support in the center of the helical structure.

33. A method to remove ions, the method comprising:
providing an electrical potential difference between a first and the second electrode in a housing;
allowing water to flow between the first and the second electrodes from an inlet of the housing to an outlet of the housing;
forcing the water to rotate in a rotational direction around a principal axis substantially parallel to the first electrode and/or the second electrode; and
improving the ion flux from the water to the first electrode and/or the second electrode.

34. An apparatus to remove ions from water, the apparatus comprising:
a housing comprising:
an inlet to let water into the housing,
an outlet to let water out of the housing, and
a first and a second electrode connected to a power controller configured to apply an electrical potential difference between the first and the second electrodes;
a spacer between the first and second electrodes to allow water to flow in between the first and second electrodes, the spacer comprising a pillar structure.

35. The apparatus according to clause 34, wherein the first and second electrodes each have a substantially flat surface and the pillar structure is between the first and second electrodes to keep the first and second electrodes at a substantially constant distance from each other.

36. The apparatus according to clause 35, wherein the pillar structure is sandwiched in between the flat surface of the first and second electrodes or a membrane of the first electrode and/or the second electrode.

37. The apparatus according to any of clauses 34-36, wherein the pillar structure is physically or chemically attached onto a surface of the first electrode and/or the second electrode or a membrane of the first electrode and/or the second electrode.

38. The apparatus according to any of clauses 34-37, wherein the pillar structure is, between the electrodes, substantially perpendicular to the flow direction.

39. The apparatus according to any of clauses 34-38, wherein the spacer comprises a netting framework to keep pillars of the pillar structure at a substantially fixed distance from each other.

40. The apparatus according to clause 39, wherein the netting framework is constructed and arranged to keep the longitudinal axis of the pillar structure substantially perpendicular with respect to the flow direction of the water flowing between the first and second electrodes.

41. The apparatus according to any of clauses 34-40, wherein the center part of the pillar structure is attached to a netting framework.

42. The apparatus according to any of clauses 39-41, wherein the netting framework and/or pillar structure creates movement of water substantially perpendicular to the flow direction of the water flowing between the first and second electrodes.

43. The apparatus according to any of clauses 34-42, wherein the pillar structure comprises a thicker middle portion in order to provide for an increased flow resistivity in the center of a flow channel in between the first and second electrodes.

44. The apparatus according to any of clauses 34-43, wherein the thickness of the pillar structure decreases from the center of the pillar structure to an edge of the pillar structure.

45. The apparatus according to any of clauses 34-44, wherein the pillar structure is spherical, elliptical, rhombus, egg or ball shaped.

46. The apparatus according to any of clauses 39-45, wherein the netting framework is provided in the middle of a flow channel in between the first and second electrodes.

47. The apparatus according to any of clauses 34-46, wherein the pillar structure is made out of one piece extending over the full width of a flow channel between the first and second electrodes.

49. A method of manufacturing an apparatus to remove ions from water, the method comprising:
providing a spacer comprising a pillar structure to a first electrode; and
providing a second electrode to the spacer.

50. The method according to clause 49, further comprising providing a membrane to the first electrode before the spacer is provided to the first electrode.

51. The method according to clause 49 or clause 50, wherein providing the spacer comprises attaching the pillar structure to the first electrode or the membrane.

It is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Furthermore, the terms and phrases used herein are not intended to be limiting, but rather, to provide an understandable description of the invention.

The terms "a" or "an", as used herein, are defined as one or more than one. The term another, as used herein, is defined as at least a second or more. The terms including and/or having, as used herein, are defined as comprising (i.e., not excluding other elements or steps). Any reference signs in the claims should not be construed as limiting the scope of the claims or the invention. The mere fact that certain measures are recited in mutually different dependent claims does not indicate that a combination of these measures cannot be used to advantage. The scope of the invention is only limited by the following claims.

The invention claimed is:

1. An apparatus to remove ions from water, the apparatus comprising:
an inlet to let water into a housing
an outlet to let water out of the housing;
a first electrode and a second electrode, connected to a power controller configured to apply an electrical potential difference between the first and second electrodes; and
a velocity adjuster constructed and arranged to adjust a flow velocity of a first portion of the water flowing between the first and second electrodes with respect to a second portion of the water flowing between the first and second electrodes, wherein the velocity adjuster comprises a porous material and a flow resistance in a central region of the velocity adjuster is larger than closer to an edge of the velocity adjuster, causing the velocity of water passing through the central region of the velocity adjuster to be reduced compared to water passing closer to the edge of the velocity adjuster, wherein the first portion of the water is flowing further away from the first electrode or the second electrode than the second portion of the water.

2. The apparatus according to claim 1, wherein the velocity adjuster is constructed and arranged to adjust the flow velocity of the first portion of the water to be reduced compared to the flow velocity of the second portion of the water.

3. The apparatus according to claim 1, wherein the first portion of the water is flowing through the central region of the velocity adjuster.

4. The apparatus according to claim 1, wherein the second portion of the water is flowing closer to the edge of the velocity adjuster.

5. The apparatus according to claim 1, wherein the porosity of the porous material increases from the central region of the velocity adjuster towards the first electrode and/or the second electrode.

6. The apparatus according to claim 1, wherein the flow resistance of the velocity adjuster continuously increases from near the first electrode and/or the second electrode, towards the central region of the velocity adjuster.

7. The apparatus according to claim 1, wherein the velocity adjuster is along a spacer, outside a spacer or incorporated in a spacer.

8. The apparatus according to claim 1, wherein the velocity adjuster comprises a spacer having a grid structure which is shifted and/or rotated with respect to the first and second electrodes to adjust the velocity of the water flowing through the spacer.

9. The apparatus according to claim 1, wherein the velocity adjuster comprises a spacer with multiple layers between the first and second electrodes and a layer close to the first electrode has a low flow resistance and a layer further away from the first electrode has a relatively high flow resistance.

10. The apparatus according to claim 9, wherein the layers comprise a porous material with a low flow resistance in a first direction and a higher flow resistance in a second direction, wherein the layer close to the first electrode is oriented such that the first direction is substantially equal to the water flow direction.

11. The apparatus according to claim 10, wherein the layer further away from the first electrode is oriented such that the second direction is substantially equal to the water flow direction.

12. The apparatus according to claim 1, wherein the velocity adjuster comprises a material having small channels and the cross section of at least one of the channels in a region closer to the first electrode and/or the second electrode is larger than the cross section of at least one of the channels in the central region of the velocity adjuster.

13. The apparatus according to claim 12, wherein the velocity adjuster comprises a material that closes off a spacer but has several small channels in the longitudinal direction of the spacer through which water may pass from one side to the other and the total cross section of the channels in the region near an edge is larger than the total cross section of the channels in the central region of the velocity adjuster.

14. The apparatus according to claim 1, wherein the velocity adjuster comprises a pillar structure and the pillar structure is attached to or integrated with a netting framework such that part of the pillar structure extends away from the netting framework on opposite sides of the netting framework and the netting framework is in the middle of a flow channel between the first and second electrodes.

15. The apparatus according to claim 1, wherein the velocity adjuster comprises a plurality of pillars in a flow channel between the first and second electrodes, each of the pillars having a cross-sectional width that is smaller at a location nearer to the first electrode and/or the second electrode than the middle of the flow channel.

16. A method to remove ions, the method comprising:
providing an electrical potential difference between a first electrode and a second electrode, in a housing;
allowing water to flow between the first and second electrodes from an inlet of the housing to an outlet of the housing; and
adjusting a flow velocity of a first portion of the water with respect to a second portion of the water using a velocity adjuster, wherein the velocity adjuster comprises a porous material and a flow resistance in a central region of the velocity adjuster is larger than closer to an edge of the velocity adjuster, causing the velocity of water passing through the central region of the velocity adjuster to be reduced compared to water passing closer to the edge of the velocity adjuster,
wherein the flow velocity of the first portion of the water is lower than the flow velocity of the second portion of the water and the first portion of the water is flowing further away from the first electrode or the second electrode than the second portion of the water.

17. The method according to claim 16, wherein the velocity adjuster comprises a pillar structure and the pillar structure is attached to or integrated with a netting framework such that part of the pillar structure extends away from the netting framework on opposite sides of the netting framework and the netting framework is in the middle of a flow channel between the first and second electrodes.

18. The method according to claim 16, wherein the velocity adjuster comprises a plurality of pillars in a flow channel between the first and second electrodes, each of the pillars having a cross-sectional width that is smaller at a location nearer to the first electrode and/or the second electrode than the middle of the flow channel.

19. An apparatus to remove ions from water, the apparatus comprising:
a housing;
an inlet to let water into the housing;
an outlet to let water out of the housing;
a first electrode and a second electrode, connected to a power controller configured to apply an electrical potential difference between the first and the second electrodes; and
a spacer between the first and second electrodes to allow water to flow in between the first and second electrodes and to adjust a flow velocity of a first portion of the water flowing between the first and second electrodes with respect to a second portion of the water flowing between the first and second electrodes, the spacer being a porous material and comprising a helical structure, wherein a flow resistance in a central region of the spacer is larger than closer to an edge of the spacer, causing the velocity of water passing through the central region of the spacer to be reduced compared to water passing closer to the edge of the spacer.

20. The apparatus according to claim 19, wherein the first and second electrodes each have a substantially flat surface at a substantially constant distance from each other and the helical structure is sandwiched in between the flat surfaces of the first and second electrodes.

21. The apparatus of claim 19, wherein the helical structure has its helical axis extending between the first and second electrodes with a directional component parallel to the flow direction.

22. The apparatus of claim 19, wherein the helical structure forces the water from a position away from the first electrode toward a position closer to the first electrode.

23. The apparatus of claim 19, wherein the spacer further comprises a further helical structure having an opposite twist to the helical structure.

* * * * *